United States Patent [19]

Ide et al.

[11] Patent Number: 4,480,442
[45] Date of Patent: Nov. 6, 1984

[54] AIR CONDITIONING SYSTEM

[75] Inventors: Yuichi Ide; Yasutoshi Tsuchiya, both of Fuji; Yoshihito Mino, Shizuoka, all of Japan

[73] Assignee: Tokyo Shibaura Denki Kabushiki Kaisha, Kawasaki, Japan

[21] Appl. No.: 571,061

[22] Filed: Jan. 16, 1984

[30] Foreign Application Priority Data

Jan. 17, 1983 [JP] Japan ................................. 58-5663

[51] Int. Cl.³ ............................ F25B 7/00; F24F 3/00
[52] U.S. Cl. ..................................... 62/175; 62/288.4; 165/22
[58] Field of Search ............... 165/22; 236/51; 62/175, 62/228.4, 209

[56] References Cited

U.S. PATENT DOCUMENTS

| 4,187,543 | 2/1980 | Healey et al. ............... | 165/22 X |
| 4,368,621 | 1/1983 | Yamaguma et al. .......... | 165/22 X |
| 4,407,139 | 10/1983 | Ide et al. ..................... | 62/228.4 |

FOREIGN PATENT DOCUMENTS 5638864  9/1976  Japan.

*Primary Examiner*—William E. Wayner
*Attorney, Agent, or Firm*—Schwartz, Jeffery, Schwaab, Mack, Blumenthal & Koch

[57] ABSTRACT

An air conditioning system comprising an outdoor unit in which a compressor is driven by the power supplied from a variable-frequency power supply and a plurality of indoor units operatively connected to the outdoor unit. Each indoor unit has a circuit for generating a frequency signal to be applied to the variable frequency power supply of the outdoor unit in response to a set room temperature and a temperature detected. In response to the frequency signals transmitted from the indoor units, the control unit of the outdoor unit detects a maximum frequency, a minimum frequency and the number of operating indoor units and determines the operating frequency of the variable frequency power supply in response to the maximum and minimum frequencies and the number of operating indoor units. The control unit includes a decision circuit which responds to the frequency signals transmitted from the indoor units so as to detect a maximum frequency, a minimum frequency and the number of operating indoor units, a circuit which responds to thus obtained maximum frequency and the number of operating indoor units so as to determine an operating frequency which is to be corrected, a circuit for obtaining a correction value, which is used to correct the operating frequency, in response to the difference between the maximum and minimum frequencies and a circuit for determining an operating frequency to be applied to the variable-frequency power supply by subtracting the correction value from the operating frequency to be corrected.

5 Claims, 5 Drawing Figures

AIR CONDITIONING SYSTEM

BACKGROUND OF THE INVENTION

1. Field of the Invention

The present invention relates to an air conditioning system in which the rotational speed of a compressor is varied in response to the operation instructions from indoor units.

2. Prior Art

There has been devised and demonstrated an air conditioning system (to be referred to as "a multi-air-conditioning system" in this specification) in which one outdoor unit drives a plurality of indoor units. Such air conditioning systems have been widely used in urban areas because the installation space for an outdoor unit can be reduced. However, depending upon the number of indoor units to be driven, the air conditioning load varies widely so that the capacity control of a compressor of an outdoor unit is required. In this specification, the air conditioning load refers to a heating load, a cooling load and a load required for controlling the humidity.

In the conventional air conditioning systems, a pole change compressor has been used in order to control the capacity of the compressor. However, the pole change compressor is such that it can be only switched between two poles and four poles. As a result, the compressor can respond to some variation in air conditioning load, but cannot sufficiently control the indoor units in response to the load variation due to variation in temperature in each room and in the number of operating indoor units.

There has been also devised and demonstrated a system in which an inverter is used to control a compressor. That is, the output frequency of the inverter is varied so that the capacity of the compressor is varied. However, there has not been proposed a multi-air-conditioning system in which in response to the operation instructions derived from indoor units an optimum frequency is determined so as to control the inverter.

SUMMARY OF THE INVENTION

The primary object of the present invention is therefore to provide an air conditioning system of the type using an inverter in which in response to the operation instructions from a plurality of indoor units, an optimum inverter driving frequency is determined so that even when the load varies in a wide range, a compressor can be effectively controlled.

To the above and other ends, the present invention provides an air conditioning system of the type comprising an outdoor unit and a plurality of indoor units in which in response to the operation instructions from the indoor units, an optimum frequency is determined and applied to an inverter which in turn controls the rotational speed of a compressor; in order to obtain an optimum frequency, the operation instructions which depend upon the air conditioning loads are applied as the control request frequency data for the inverter; there is provided a first means for determining an optimum frequency depending upon a maximum frequency among the control request frequency data and the number of operating indoor units; there is provided a second means for determining a correction data based on the difference between the maximum and minimum control request frequencies; and said optimum frequency is corrected by the correction data and is applied to said first means, whereby an optimum frequency is computed.

The above and other objects, effects, features and advantages of the present invention will become more apparent from the following description of a preferred embodiment thereof taken in conjunction with the accompanying drawings.

DETAILED DESCRIPTION OF THE PREFERRED EMBODIMENT

A preferred embodiment of the present invention will be described in detail with reference to the accompanying drawings.

Figure 1:
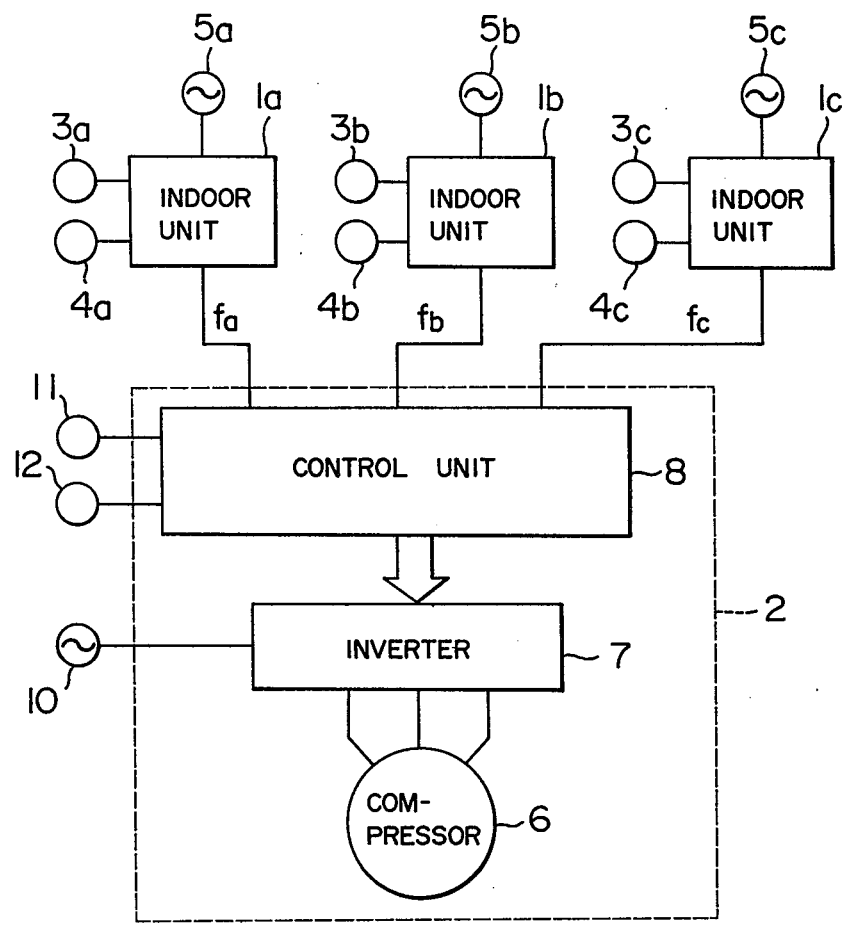
FIG. 1 shows a block diagram of an electric circuit of an air conditioning system in accordance with the present invention.

In FIG. 1 is shown a block diagram of a multi-air-conditioning system in accordance with the present invention. The multi-air-conditioning system comprises a plurality of indoor units and an outdoor unit. In this embodiment, the air conditioning system is shown as comprising three indoor units $1a$, $1b$ and $1c$ and one outdoor unit 1.

The indoor units $1a$, $1b$ and $1c$ are provided with room temperature sensors $3a$, $3b$ and $3c$ and heat-exchanger sensors $4a$, $4b$ and $4c$ and in response to the signals from these sensors and from operation switches (not shown), the indoor units $1a$, $1b$ and $1c$ are operated. The indoor units $1a$, $1b$ and $1c$ are electrically connected to indoor power supplies $5a$, $5b$ and $5c$, respectively, so that they are supplied with power.

The outdoor unit 2 has a compressor 6 for compressing a refrigerant such as freon gas, an inverter 7 for varying the frequency of an outdoor power supply 10, which supplies the power to the compressor 6, so that the rotational speed of the compressor 6 and consequently the capacity thereof can be controlled and a control unit 8 for controlling the inverter 7. The outdoor unit 2 is further provided with an outdoor heat-exchanger sensor 11 and a current sensor 12. The output signals from the sensors 11 and 12 are applied to the control unit 8.

In response to the air conditioning loads such as the difference between a temperature set and room temperature sensed by the room temperature sensors $3a$, $3b$ and $3c$ and data representative of the conditions of heat-exchangers sensed by the heat-exchanger sensors $4a$, $4b$ and $4c$, the indoor units $1a$, $1b$ and $1c$ request the control unit 8 to generate the operation instruction in response to which the capacity of the compressor 6 for operating the indoor units $1a$, $1b$ and $1c$ is determined.

The operation instruction is applied to the control unit 8 in the form of a control request frequency data requested to the inverter. The operation instructions from the indoor units $1a$, $1b$ and $1c$ are transmitted to the control unit through signal lines.

In response to the operation instructions and to the output signals from the outdoor heat-exchanger sensor 11 and the current sensor 12, the control unit 8 determines a frequency with which the compressor 6 is operated.

In this embodiment, the control unit 8 controls the frequency between 20 and 90 Hz.

The inverter 7 drives the compressor 6 with a three-phase output at 20–90 Hz.

Figure 2:
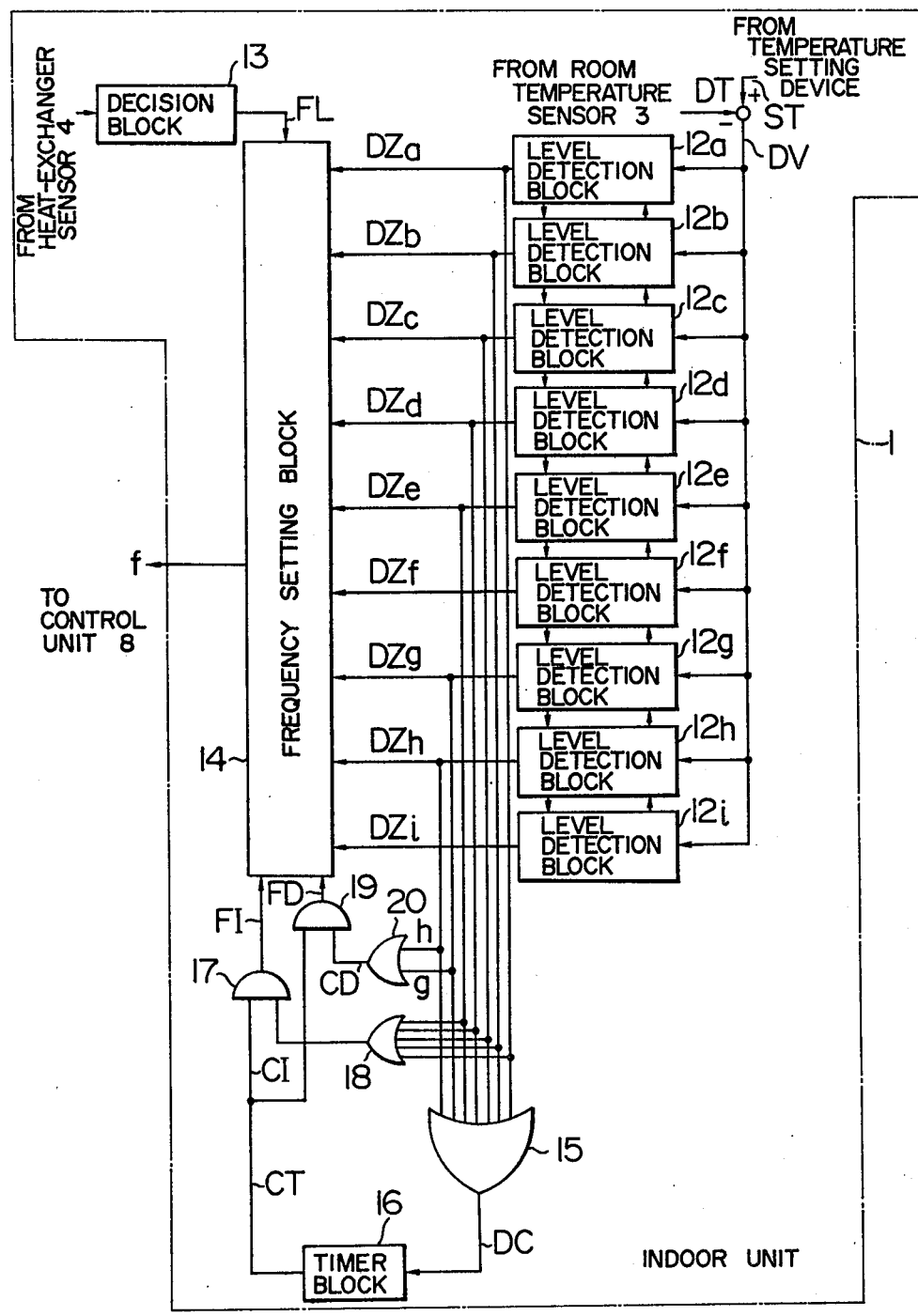
FIG. 2 is a block diagram of an indoor unit.

In FIG. 2 is shown the construction of each of the indoor units 1a, 1b and 1c. A temperature value ST set by a room temperature setting device (not shown) and the output signal from the room temperature sensor are applied to an adder 11 so that a deviation DV is applied to level detection blocks 12a through 12i which detect the value of the deviation DV. That is, in response to the deviation DV, only one of the level detection blocks 12a through 12i delivers an H output. For instance, when the deviation DV is higher than 2.5° C., the level detection block 12a delivers the H output. If the deviation DV is between 2.0° and 2.5° C., the level detection block 12b delivers the H output while the level detection block 12a is reset.

The outputs DZa through DZi from the level detection blocks 12a through 12i are applied to a frequency setting block 14. In response to the output signals DZa through DZi, the frequency setting block 14 sets a frequency f. The frequency setting block 14 further receives a frequency limiting signal FL, a frequency increment signal FI and a frequency decrement signal FD. A decision block 13 detects a signal which is derived from the heat-exchanger sensor 4 and represents the temperature of the refrigerant and when the temperature of the refrigerant is in excess of a predetermined value, the decision block 13 applies an H output to the frequency setting block 14. In response to the H output, the frequency setting block 14 controls the frequency f at a value lower than a predetermined value.

The frequency increment and decrement signals FI and FD are applied to the frequency setting block 17 through OR gates 15, 18, 20, AND gates 17 and 19 and a timer block 16. The frequency increment signal FI is generated when one of the level detection blocks 12a through 12d delivers the H output; that is, when the deviation DV is positive and high. On the other hand, the frequency decrement signal FD is generated when the level detection blocks 12g and 12h deliver the H outputs; that is, when the deviation DV is negative. That is, when one of the level detection blocks 12a through 12d and 12g and 12h delivers the H output, the OR gate 15 applies a change signal DC to the timer block 16. In response to the change signal DC, the timer block 16 applies a change instruction CT to one inputs of the AND gates 17 and 19 at a predetermined time interval of, for instance, five minutes. When the H output is derived from one of the level detection blocks 12a through 12d, the H output from the OR gate 18 is applied to the other input of the AND gate 17 which in turn delivers the frequency increment signal FI to the frequency setting block 14. When the H output is derived from one of the level detection blocks 12g and 12h, the H output is applied from the OR gate 20 to the other input of the AND gate 19.

As described above, in response to the deviation zone signals DZa through DZh, the frequency limiting signal FL and the frequency increment and decrement signals FI and FD, the frequency setting block 14 generates the frequency f which in turn is applied to the control unit 8 of the outdoor unit 2.

Figure 3:
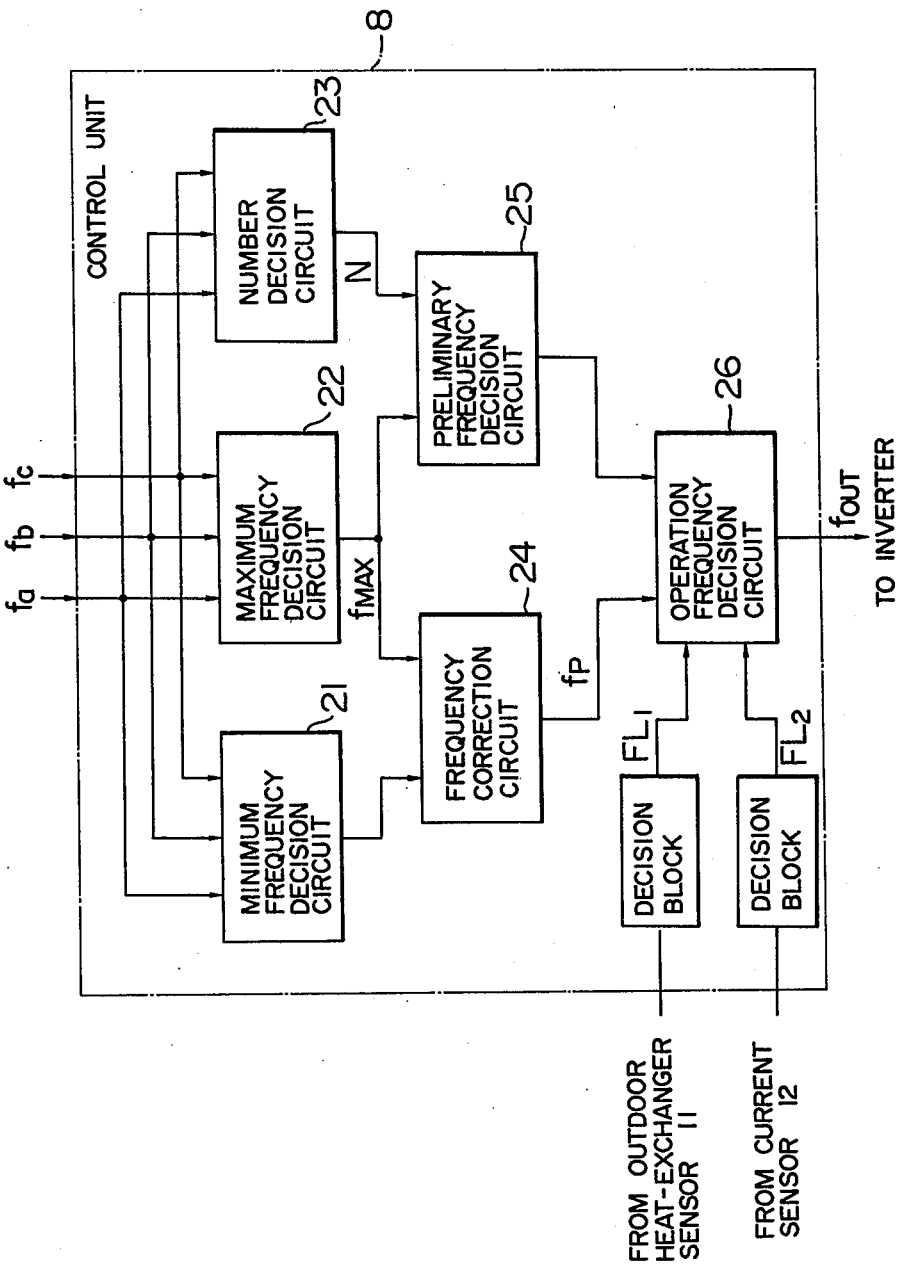
FIG. 3 is a block diagram of a control unit of an outdoor unit.

FIG. 3 shows the detail of the control unit 8 which responds to the frequency signal fa, fb and fc transmitted from the indoor units 1a, 1b and 1c so as to determine the operation frequency $f_{out}$. More particularly, the frequency signal fa, fb and fc are applied to a maximum frequency decision circuit 22, a minimum frequency decision circuit 21 and a number decision circuit 23 for determining the number of units to be operated. Assume that fa=70 Hz, fb=30 Hz and fc=0. Then, the output $f_{MIN}$=30 Hz is derived from the minimum frequency decision circuit 21; the output $f_{MAX}$—70 Hz is derived from the maximum frequency decision circuit 22; and the output N=2 (units) is derived from the number decision circuit 23.

The output $f_{MIN}$ from the minimum frequency decision circuit 21 is applied to a frequency correction circuit 24; the output $f_{MAX}$ from the maximum frequency decision circuit 22 is applied to the frequency correction circuit 24 and a preliminary frequency decision circuit 25 for determining an optimum frequency before the correction is made; the output N from the decision circuit 23 is applied to the preliminary frequency decision circuit 25. In response to the outputs $f_{MIN}$ and $f_{MAX}$, the frequency correction circuit 24 obtains the difference between $f_{MAX}$ and $f_{MIN}$; that is, ($f_{MAX}-f_{MIN}$)=40 Hz and obtains a correction signal fp from Table 4 to be described below which in turn is applied to an operation frequency decision circuit 26. In response to the output $f_{MAX}$ and the output N, the preliminary frequency decision circuit 25 picks up an optimum frequency fq from Table 3 to be described below which in turn is applied to the operation frequency decision circuit 26. In response to the inputs fp and fq, the operation frequency decision circuit 26 obtains the difference between the outputs fq and fp so as to determine the operation frequency $f_{out}$. In this case, if the frequency limiting signal FL1 or FL2 is applied from a decision block 27 or 28 to the operation frequency dicision circuit 26, the operation frequency $f_{out}$ is controlled. More particularly, when the temperature of the refrigerant which is sensed by the outdoor heat exchanger sensor 11, is in excess of a predetermined level, the decision block 27 applies the H output or the signal FL1 to the operation frequency decision circuit 26. When the current flowing through the compressor is detected by the current sensor 12 to be in excess of a predetermined value, the decision block 28 applies the H output or the signal FL2 to the operation frequency decision circuit 26.

Thus obtained output $f_{out}$ is applied to the inverter 7 (See FIG. 1) so that the compressor 6 is operated at an optimum rotational speed.

Figure 4:
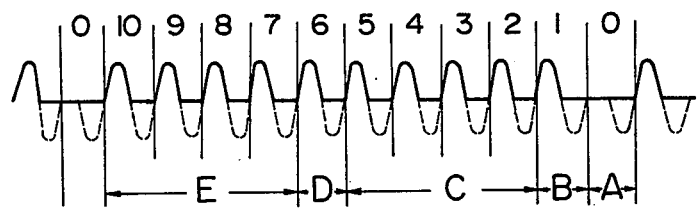
FIG. 4 shows an example of a signal to be transmitted from an indoor unit to an outdoor unit.

FIG. 4 shows the operation instruction transmitted from the indoor unit 1a, 1b or 1c to the control unit 8. The operation instruction is the data consisting of 11 bits from 0–10 and is transmitted by utilizing the positive half cycles of the power supply frequency. Depending upon whether the positive half cycle of each bit is "0" or "1", the following meaning is defined. The period A during which "0" bits continue is called the start bit which indicates the start of data. That is, when data is started, the period A always indicates "0". The period B indicates the cooling or heating condition. That is, when a "0" bit appears during the period B, the cooling condition is designated. On the other hand, when a "1" bit appears during the period B, the heating condition is designated. The period C shows a frequency data which represents 16 frequencies ranging from 0 to 90 Hz by combinations of four bits (2, 3, 4 and 5).

The 16 frequencies are represented as shown in Table 1.

TABLE 1

| frequency (Hz) | period C bit | | | |
|---|---|---|---|---|
| | 2 | 3 | 4 | 5 |
| 0 | 0 | 0 | 0 | 0 |
| 20 | 0 | 0 | 0 | 1 |
| 25 | 0 | 0 | 1 | 0 |
| 30 | 0 | 0 | 1 | 1 |
| 35 | 0 | 1 | 0 | 0 |
| 40 | 0 | 1 | 0 | 1 |
| 45 | 0 | 1 | 1 | 0 |
| 50 | 0 | 1 | 1 | 1 |
| 55 | 1 | 0 | 0 | 0 |
| 60 | 1 | 0 | 0 | 1 |
| 65 | 1 | 0 | 1 | 0 |
| 70 | 1 | 0 | 1 | 1 |
| 75 | 1 | 1 | 0 | 0 |
| 80 | 1 | 1 | 0 | 1 |
| 85 | 1 | 1 | 1 | 0 |
| 90 | 1 | 1 | 1 | 1 |

The period D which indicates the sixth bit is called a release bit. That is, when the output signal from the indoor heat-exchanger sensor 4a, 4b or 4c reaches a predetermined level, the signal "0" appears so that the operation frequency is decreased regardless of the data which appears during the period C.

The four bits (7 through 10) which appear during the period E are always "1"s and are called the stop bits which are used to distinctly identify the start bit period A for the control unit 8.

As described above, the operation instruction consists of a digital signal which is a serial data including the control request frequency data (period C) so that there is an advantage that the number of signal lines interconnecting between the indoor and outdoor units can be reduced.

Next the mode of operation of the multi-air-conditioning system will be described. The data which appears during the period B is determined by turning on an operation switch (not shown) of the indoor unit 1a, 1b or 1c. That is, when a cooling switch is turned on, the data becomes "0", but when a heating switch is turned on, the data becomes "1". Thus the outdoor unit 2 is switched between the cooling and heating cycles.

During the operation of the air conditioning system, the data which appears during the period C is determined in response to room temperature and the temperature of the heat-exchanger.

Figure 5:
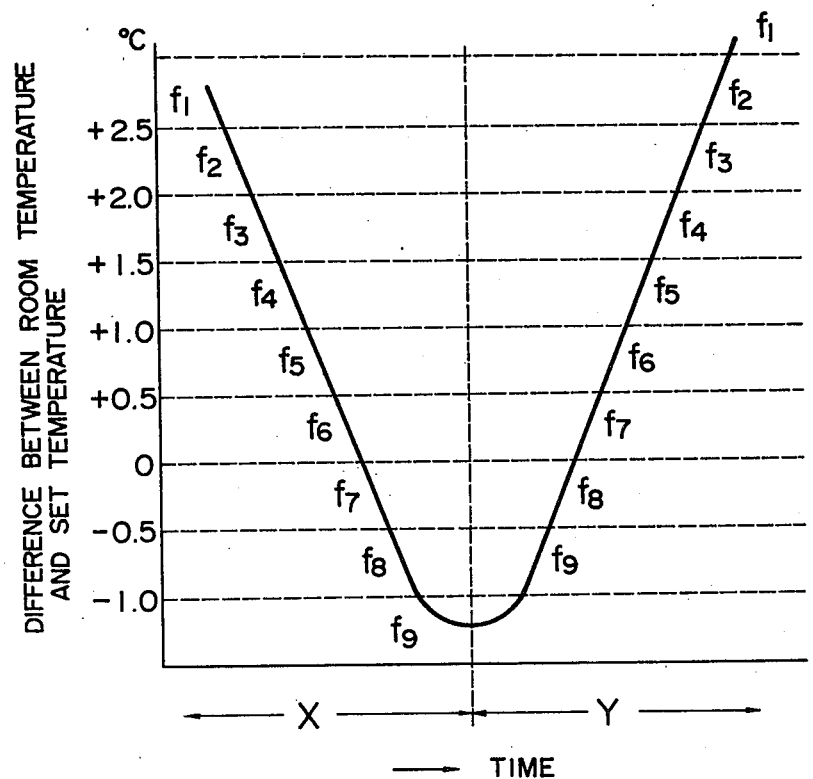
FIG. 5 is a diagram used to explain the mode of operation of a compressor of the outdoor unit.

FIG. 5 shows a plurality of refrigeration cycle zones divided in response to the difference between room temperature and a temperature set. As shown in FIG. 5, depending upon whether room temperature rises or falls, a plurality of zones are provided. The zone in which the temperature falls is indicated by X while the zone in which temperature rises, by Y. The zone X is divided into a plurality of sub-zones each representing the difference between room temperature and a temperature set and a control request frequency is allocated for each sub-zone.

For instance, assume that the room temperature is higher than a set temperature by higher than 2.5° C. Then the control request frequency of 90 Hz is allocated to this sub-zone. When the difference between the room temperature and a set temperature is between 2.0° and 2.5° C., 80 Hz is allocated. In like manner, when the difference is less than −1.0° C., 0 Hz (stop) is allocated. Table 2 shows the relationship between the temperature ranges and the control request frequencies.

TABLE 2

| room temperature − set temperature (temperature range) (°C.) | control request frequency (Hz) | room temperature − set temperature (temperature range) (°C.) | control request frequency (Hz) |
|---|---|---|---|
| higher than 2.5 | $f_1(90)$ | 0–0.5 | $f_6(40)$ |
| 2.0–2.5 | $f_2(80)$ | −0.5–0 | $f_7(30)$ |
| 1.5–2.0 | $f_3(70)$ | −1.0–0.5 | $f_8(20)$ |
| 1.0–1.5 | $f_4(60)$ | higher than 1.0 | $f_9(0)$ (stop) |
| 0.5–1.0 | $f_5(50)$ | | |

For instance, when the difference between the room temperature and a set temperature is between 1.0° and 1.5° C., the indoor unit 1 gives the operation instruction to the control unit so that the frequency setting signal of 60 Hz is delivered to the inverter 7.

The control request frequency data are transmitted from the three indoor units 1a, 1b and 1c, respectively, and in response to the three data, the control unit 8 carries out the following steps in order to calculate an optimum frequency.

First, of the control request frequency data transmitted from the indoor units 1a, 1b and 1c, the data which demands the highest frequency output is held effective and in response to this data and the number of indoor units operated a predetermined relationship is determined. Depending upon this predetermined relationship, an optimum frequency is obtained.

Table 3 shows an example of the relationship between the number of operating indoor units and optimum frequencies when the data $f_{MAX}$ is given which demands a maximum operation frequency.

TABLE 3

| $f_{MAX}$ (Hz) | number of indoor units | | |
|---|---|---|---|
| | 1 | 2 | 3 |
| 0 | 0 | 0 | 0 |
| 20 | 20 | 20 | 20 |
| 30 | 30 | 30 | 30 |
| 40 | 40 | 40 | 40 |
| 50 | 50 | 50 | 50 |
| 60 | 50 | 60 | 60 |
| 70 | 50 | 70 | 70 |
| 80 | 50 | 70 | 80 |
| 90 | 50 | 70 | 90 |

As shown in Table 3, when $f_{MAX}$ is 90 Hz, the optimum frequency is set to 90 Hz when three indoor units are operated; the optimum frequency is set to 70 Hz when two indoor units are operated; and the optimum frequency is set to 50 Hz when only one indoor unit is operated.

For instance, assume that the maximum control request frequency from an indoor unit is 80 Hz. Then, when only one indoor unit is operated, the control request frequency of 80 Hz is not used as is clear from Table 3, but 50 Hz is selected as an optimum frequency. When two indoor units are operating, 70 Hz is selected. Only when three indoor units are operating the maximum control request frequency of 80 Hz is used.

Next the difference between a maximum control request frequency and a minimum control frequency is obtained and depending upon the difference, predetermined correction data are obtained.

Table 4 shows an example of the correction of data in response to the frequency difference.

TABLE 4

| ($f_{MAX} - f_{MIN}$) | correction of frequency |
|---|---|
| less than 20 Hz | 0 |
| 30–50 Hz | −10 Hz |
| higher than 60 Hz | −20 Hz |

In response to the correction data, an optimum frequency is determined. The correction method will be described in detail below. For instance, assume that two indoor units A and B are being operated and the control request frequency from the indoor unit A be 70 Hz while the control request frequency from the indoor unit B be 30 Hz. From Table 3, the maximum control request frequency $f_{MAX}$ is 70 Hz and since two indoor units are being operated, an optimum frequency is 70 Hz. Next from Table 4, the correction value −10 Hz is obtained for $f_{MAX}(70\ Hz) - f_{MIN}(30\ Hz) = 40$ Hz. Therefore the optimum frequency is corrected as follows: 70−10=60 (Hz). That is, the optimum frequency is set to a value lower than the previously selected optimum frequency. As described above, according to the present invention, an optimum frequency is corrected in response to the difference between the maximum and minimum control request frequencies. The reason is as follows. If an optimum frequency is determined depending on a maximum control request frequency which represents only one indoor unit and the number of operating indoor units, an operation frequency higher than an optimum frequency is selected when there exists a demand for a very low control request frequency. As a result, the operation efficiency or the pressure of the refrigeration cycle is abnormally increased.

It should be noted that even when the same number of indoor units is operating, the frequency data as shown in Table 3 may be changed depending upon the cooling and heating operation. Furthermore, when the capacity of the indoor units is different, the capacity of each indoor unit may be given a weight. Therefore, even if the same number of indoor units are operating, the frequency data as shown in Table 3 may be changed depending upon which indoor units are operating.

When the air conditioning system is controlled in the manner described above, the control on the excessive load in the refrigeration cycle can be effected.

The control unit 8 mainly consists of a microcomputer and operates in a manner substantially similar to that of the microcomputer. As a result, it can be easily made to store and change the data which are shown in Table 3 and are determined depending upon the number of operating indoor units as well as the correction data which are shown in Table 4 and are determined depending upon the difference between the maximum and minimum control request frequencies. Moreover, the control based on these data can be easily carried out.

Effects of the Invention

As described in detail above, according to the present invention, there is provided a control unit mainly consisting of a microcomputer and an optimum operation frequency is determined by subtracting from a frequency, which is obtained in response to the maximum control request frequency and the number of operating indoor units, a correction frequency which is obtained depending upon the difference between the maximum and minimum control request frequencies. As a result, the problems caused by the increase or decrease in air conditioning load can be substantially overcome and the control on the excessive load in the refrigeration cycle can be carried out. Therefore, the abnormal increase in pressure in refrigeration cycle can be eliminated and it becomes possible to control the room temperature in such a way that the room temperature is less deviated from a set temperature.

What is claimed is:

1. An air conditioning system comprising:
    a capacity-variable outdoor unit in which a compressor is driven by the power supplied from a variable-frequency power supply;
    a plurality of indoor units which are supplied with a refrigerant from said outdoor unit so as to control room temperature;
    each of said plurality of indoor units having a frequency signal circuit which generates a frequency signal to be applied to said outdoor unit depending on the difference between a set temperature and a temperature detected by a room temperature sensor means; and
    said outdoor unit having a control unit comprising a decision circuit which responds to the frequency signals received from said plurality of indoor units so as to obtain a maximum frequency, a minimum frequency and the number of operating indoor units, a circuit for obtaining an operating frequency to be corrected, in response to said maximum frequency and the number of operating indoor units, a circuit for obtaining a correction value in response to the difference between said maximum and minimum frequencies and a circuit for determining an operation frequency which is applied to said variable-frequency power supply by subtracting said correction value from said operating frequency to be corrected.

2. An air conditioning system as set forth in claim 1 wherein said frequency signal circuit limits the frequency of said frequency signal when the temperature of a refrigerant which is circulated through a heat exchanger of each of said plurality of indoor units is in excess of a predetermined level.

3. An air conditioning system as set forth in claim 1 wherein said control unit limits the frequency of said operating frequency when the temperature of a refrigerant which is circulated through a heat exchanger of said outdoor unit and/or the current of said compressor is in excess of a predetermined level.

4. An air conditioning system as set forth in claim 1 wherein said frequency signal derived from said frequency signal circuit is a digital signal consisting of serial data including frequency data.

5. An air conditioning system as set forth in claim 4 wherein said digital signal is synchronized with a power supply means.

* * * * *